(12) United States Patent
Grewal

(10) Patent No.: US 12,012,030 B2
(45) Date of Patent: Jun. 18, 2024

(54) JOBSITE BREAKROOM

(71) Applicant: Harjaspreet Grewal, Sacramento, CA (US)

(72) Inventor: Harjaspreet Grewal, Sacramento, CA (US)

( * ) Notice: Subject to any disclaimer, the term of this patent is extended or adjusted under 35 U.S.C. 154(b) by 562 days.

(21) Appl. No.: 16/600,342

(22) Filed: Oct. 11, 2019

(65) Prior Publication Data

US 2021/0107391 A1 Apr. 15, 2021

(51) Int. Cl.
*B60P 3/025* (2006.01)
*A47B 31/02* (2006.01)
*B60P 3/32* (2006.01)

(52) U.S. Cl.
CPC ............. *B60P 3/025* (2013.01); *A47B 31/02* (2013.01); *B60P 3/0257* (2013.01); *B60P 3/32* (2013.01)

(58) Field of Classification Search
CPC .... B60P 3/025; B60P 3/0257; B62B 2202/67; B62B 2204/00; B62B 1/002; A47B 31/00; A47B 31/02; A47B 2031/002; A47J 31/005
USPC ............................................ 296/22; 180/19.1
See application file for complete search history.

(56) References Cited

U.S. PATENT DOCUMENTS

| | | | | |
|---|---|---|---|---|
| 489,893 A * | 1/1893 | Buckley | ................ | B60P 3/0257 |
| | | | | 296/22 |
| 1,513,357 A * | 10/1924 | Webber | ................ | A47B 31/02 |
| | | | | 219/214 |
| 3,627,344 A * | 12/1971 | Rizzuto | ................ | B62B 3/1492 |
| | | | | 280/767 |
| 4,138,504 A * | 2/1979 | Mack | .................... | A47J 39/006 |
| | | | | 426/520 |
| 4,880,954 A * | 11/1989 | Bennett | .................... | H05B 6/66 |
| | | | | 219/679 |
| 5,111,127 A * | 5/1992 | Johnson | .............. | H01M 50/296 |
| | | | | 320/101 |
| 5,154,317 A * | 10/1992 | Roppolo, III | ............ | B67D 1/08 |
| | | | | 222/530 |
| 5,628,522 A * | 5/1997 | Hall | ........................ | B60B 33/06 |
| | | | | 280/46 |
| 6,777,654 B1 * | 8/2004 | Greenburg | .............. | A47F 10/06 |
| | | | | 219/679 |

(Continued)

FOREIGN PATENT DOCUMENTS

CN 108835905 A * 11/2018

*Primary Examiner* — Amy R Weisberg
*Assistant Examiner* — Wenwei Zhuo
(74) *Attorney, Agent, or Firm* — Arjomand Law Group, PLLC

(57) ABSTRACT

The disclosed apparatus teach the manufacturing and construction of versatile and portable small kitchens that basically need electricity, for use at jobsites such as building construction sites. In some embodiments the disclosed apparatus may also be attached to a water hose, in which case they provide all the facilities and amenities of house kitchens. In various embodiments and examples the appliances and facilities of the disclosed mini-breakrooms may be secured to a dolly or attached to a cart and may be easily replaced or be interchanged with other appliances and facilities. In different embodiments the mini-breakroom-amenities may be electrically connected to each other while only one of them is connected to the power supply.

15 Claims, 5 Drawing Sheets

(56) References Cited

U.S. PATENT DOCUMENTS

| | | | | |
|---|---|---|---|---|
| 6,974,904 B2* | 12/2005 | Azzam | | H02S 20/30 |
| | | | | 136/246 |
| 7,168,599 B1* | 1/2007 | Criswell | | B67D 7/845 |
| | | | | 414/490 |
| 7,417,437 B1* | 8/2008 | Torres | | B62B 1/10 |
| | | | | 324/426 |
| 7,511,451 B2* | 3/2009 | Pierce | | H01M 50/251 |
| | | | | 361/666 |
| 7,915,856 B2* | 3/2011 | Krampitz | | G01R 31/385 |
| | | | | 324/426 |
| 7,950,679 B2* | 5/2011 | Claffy | | A47J 39/006 |
| | | | | 280/47.35 |
| 8,384,000 B2* | 2/2013 | Ruffing | | A47F 9/00 |
| | | | | 126/275 R |
| 8,505,960 B1* | 8/2013 | Shindelar | | B62B 3/022 |
| | | | | 280/651 |
| 8,742,304 B2* | 6/2014 | Emma | | H05B 6/66 |
| | | | | 219/679 |
| 10,584,915 B2* | 3/2020 | Nelson | | F25D 23/12 |
| 11,589,701 B1* | 2/2023 | Abu-Saymeh | | B64D 11/0007 |
| 2004/0195793 A1* | 10/2004 | Sullivan | | B65D 25/2841 |
| | | | | 280/63 |
| 2006/0175779 A1* | 8/2006 | Zak | | B62B 3/165 |
| | | | | 280/33.998 |
| 2010/0026151 A1* | 2/2010 | Melkumyan | | B62B 3/005 |
| | | | | 312/249.11 |
| 2011/0175307 A1* | 7/2011 | Tsai | | B62B 1/002 |
| | | | | 280/47.18 |
| 2012/0119459 A1* | 5/2012 | Hanson | | B62B 1/002 |
| | | | | 280/47.17 |
| 2013/0033015 A1* | 2/2013 | Hou | | B62B 3/02 |
| | | | | 280/47.371 |
| 2015/0282615 A1* | 10/2015 | Ambruster | | B62B 3/003 |
| | | | | 414/800 |
| 2016/0052534 A1* | 2/2016 | Henao | | B62B 5/067 |
| | | | | 280/659 |
| 2016/0231029 A1* | 8/2016 | Pan | | A47B 23/04 |
| 2017/0110896 A1* | 4/2017 | Gissin | | H02J 7/0048 |
| 2022/0325949 A1* | 10/2022 | Al-Thani | | A47J 31/005 |
| 2023/0106691 A1* | 4/2023 | Söödi | | B62B 3/005 |
| | | | | 312/236 |

\* cited by examiner

JOBSITE BREAKROOM

CROSS-REFERENCE(S) TO RELATED APPLICATION(S)

None

TECHNICAL FIELD

This application relates generally to breakrooms. More specifically, this application relates to a simple portable dolly or cart that contains the major appliances and facilities of a breakroom.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is explained with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references using a dolly or a cart that include a stack of small appliances, it will be appreciated that the disclosure may include other forms of carts and appliance arrangements to which the disclosed apparatus also apply. Furthermore, these apparatus may be utilized for jobsites such as building construction sites, parties, trips, picnics, poolside, camping grounds and the like.

The disclosed apparatus teach the manufacturing and construction of convenient, versatile, and portable/moveable/transportable small kitchens and recreation rooms. These apparatus basically need electricity. In some embodiments the disclosed apparatus may also be attached to a water supply, in which case they provide all the facilities and amenities of house kitchens and/or recreation rooms. In various embodiments and examples, the appliances and facilities of the disclosed mini-breakrooms may be easily replaced or be interchanged with other appliances and facilities.

Figure 1:
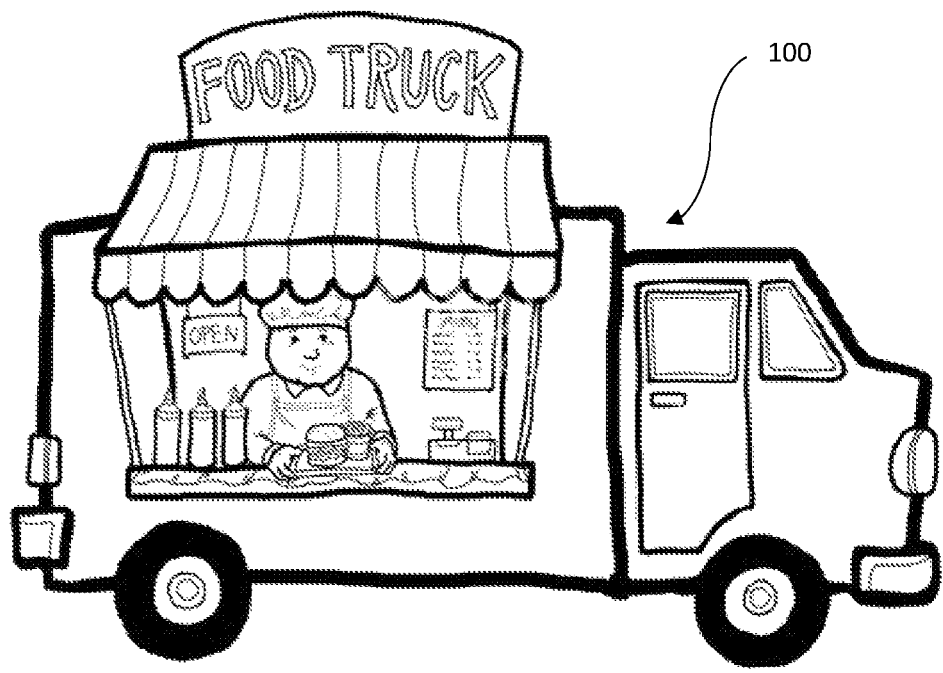
FIG. 1 illustrates a traditional food-truck.

Traditionally, as illustrated in FIG. 1, food-trucks 100 come and park close to the jobsites and the people working at the jobsites approach them during their lunch and other breaks to buy food and drink. Some of these food-trucks 100 also play music for their customers. To use the traditional food-trucks, for example parked near a high-rise construction site, the workers have to come down tens of stories and possibly change their special uniforms and boots. It would have been much more convenient if the workers at each floor or at each few floors could have all or most of the kitchen facilities of a food-truck on a dolly or a cart that could be easily moved around or be transported to other floors.

Figure 2A:
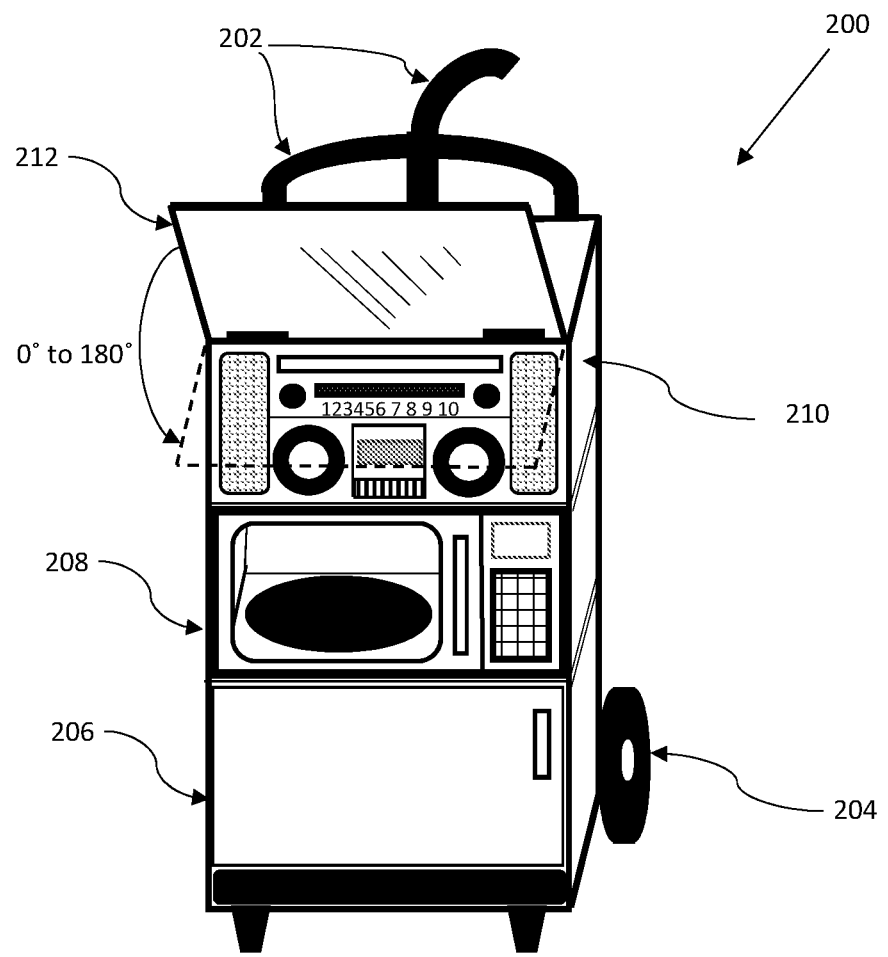
FIG. 2A illustrates a dolly and the reduced size amenities of a breakroom in a stacked arrangement secured on the dolly.

FIG. 2A illustrates a breakroom system 200 that includes reduced size (mini) amenities of a breakroom in a stacked arrangement secured to a dolly 202. In different embodiments this system 200 may be connected to a power source or may have its own chargeable or non-chargeable battery or an electrical power generator or a combination thereof. Similarly, in various embodiments system 200 may be connected to a water hose/pipe or have its own replaceable or refillable water tank with or without a water-tap. Various embodiments of system 200 may include any one or a combination of a toolbox, a USB port, an antenna for the radio and/or for the wireless access points to create hotspots, a current limiting device, lights, fan, foldable table 212 or non-foldable table, retractable or non-retractable chair, foldable or non-foldable chair, two motorized or non-motorized wheels 204, a GPS, an alarm, loud speakers, communication system, individual facility and/or collective locking mechanism, a cooler, a refrigerator 206, a freezer, a microwave 208, a sink, a faucet, a toaster, a food-processor, a mixer, a burner, a coffee maker, a storage cabinet, a drawer, a trashcan, a wet or dry vacuum, a washer, a dryer, a washer-dryer, and/or a radio/TV/music player 210, only a few of which are shown as examples. The system 200 may also have manual or automatic switches that turns off an appliance such as the refrigerator/cooler while another appliance such as the microwave is turned on. Various embodiments may have one or more programmable or non-programmable processors or processing units and memories that keep track of the total amperage used by the facilities of the system 200 and prevent overloading the power supply by, for example, cutting the power off to one or more appliances or manipulating their ON/OFF switches. Such processors or processing units may further include some memory for program and data, data and control signal buses, input/output ports, and other electronic devices as needed, such as beepers and LED lights for status information and alarm.

The system 200, in some embodiments, may also include power and/or water connectors or ports that easily mate with power or water connectors or ports of mini appliances upon placing the desired appliances in their allotted spaces. This easy installation of the facilities and the simple exchange or replacement of appliances also prevent entanglement of multiple cables or pipes traditionally attached to the appliances. To use this advantage of the system 200, mini amenities and appliances may be manufactured with special connectors that can mate with system 200 connectors. Such connectors are known to all those skill in the related arts. The system 200 may additionally include a GPS for locating the system 200 in case of theft or misplacement and/or an alarm that is activated in case of an unauthorized attempt to move the system 200 and/or to use any of its facilities. In various embodiments the system 200 is capable of broadcasting its location. In some embodiments of system 200 one or more locking mechanisms are furnished to lock individual amenities or to open and close all facilities together. There may also be a mechanical and/or an electrical key/switch that cuts the power and/or the water to the system 200 amenities even though the dolly receives power and/or water. In various embodiments some or all of the amenities may have a male electrical plug attached to them to be able to be connected, for example, to an extension cord or a power supply outlet.

Figure 2B:
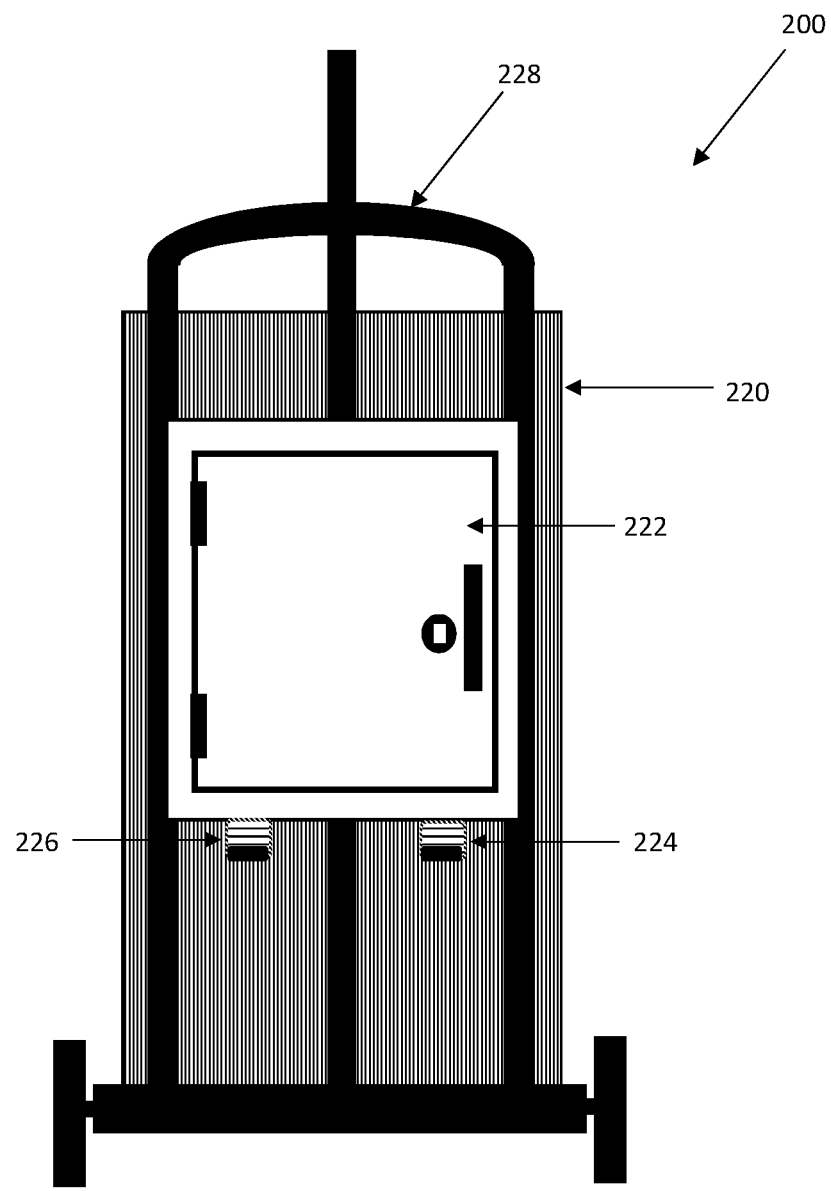
FIG. 2B illustrates the back side of the dolly of FIG. 2A and the control box.

FIG. 2B illustrates the back side of the example dolly system 200 of FIG. 2A. As seen in FIG. 2B, in this example embodiment a sheet 220 is permanently or detachably attached to the dolly 228 and together with the dolly 228 forms a framework/skeleton for system 200. In other embodiments the dolly 228 itself is the framework of the system 200. In some embodiments sheet 220 may have protruded racks, shelves, or compartments to house the amenities and appliances. Again in other embodiments the facilities and appliances may be directly connected to the sheet 220. The example embodiment of FIG. 2B has a water connector 224 and an electricity connector 226. In some embodiments one or both of these connectors may be inside the control box 222. In various embodiments of system 200 any combination of the USB port, the current limiting device, the GPS, the alarm, the communication system, the individual facility and/or collective locking mechanism, the manual or automatic switches that turns off an appliance such as the refrigerator/cooler while another appliance such as the microwave is turned on, the one or more programmable or non-programmable processors or processing units and memories, and the switch(es) that cut the power and/or the water to the system 200 amenities may be placed in the lockable control box 222. In various embodiments the dolly 228 may be used as an antenna or antennas be attached to it. Other accessories may include different kinds of lights, such as LEDs, connected to different parts of system 200, retractable handle for dolly 228, and surge protection and USB port connected to the dolly 228 or to other parts of system 200.

Figure 3:
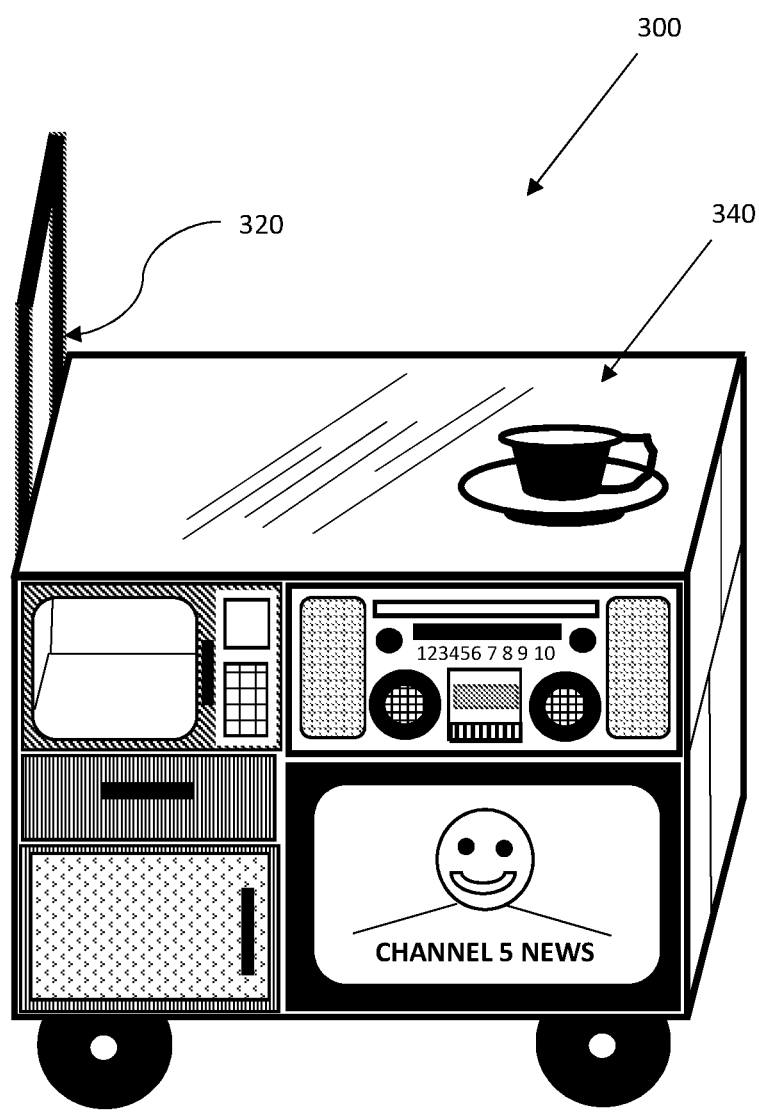
FIG. 3 illustrates reduced size facilities of a breakroom attached to a cart.

FIG. 3 illustrates reduced size amenities of a breakroom 300 attached to a cart 320. Such systems 300, which utilizes carts, have the potential to contain more amenities and be approachable from several sides. The upper surface(s) 340 of systems 300 also have the potential to serve as tables. All teachings and attributes mentioned above for system 200 are applicable to system 300 as well.

Figure 4A:
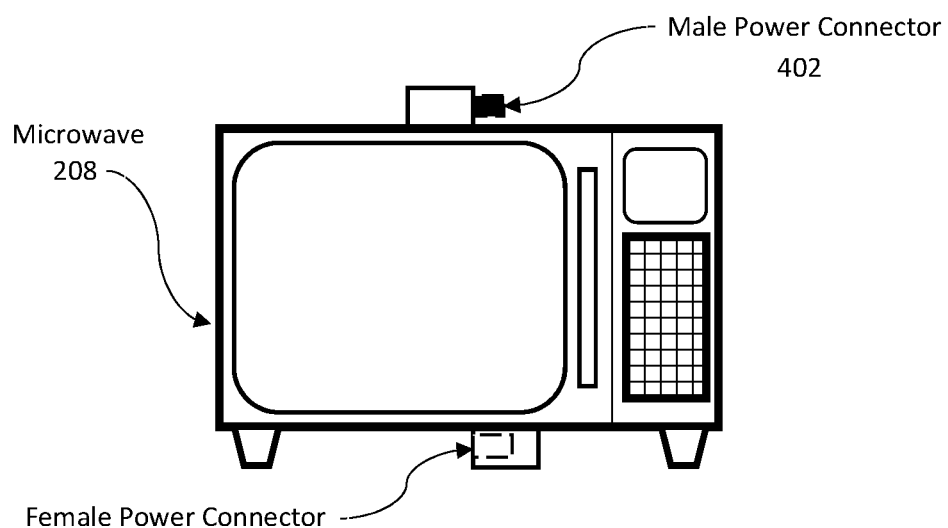
FIGS. 4A and 4B are schematic diagrams of an exemplary method of how multiple appliances can electrically mate with each other and share the electricity that one of the appliances receives.
Figure 4B:
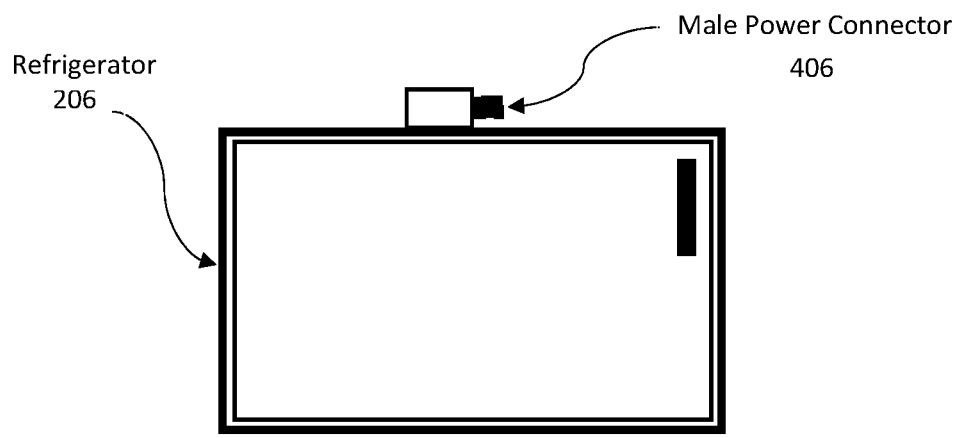

FIGS. 4A and 4B are schematic diagrams showing how multiple appliances can electrically mate with each other and share the electricity that one of the appliances receives. For example, in a stacking arrangement such as shown in FIG. 2, the bottom appliance 206 (Refrigerator) may be plugged into the power source and the appliance 208 (Microwave) situated on top of it receive its power from appliance 206 and the top most appliance 210 (TV/music player) receive its power from appliance 208. While the electrical mating and interlocking can be accomplished by different mechanisms, FIGS. 4A and 4B schematically illustrate one such device.

In FIG. 4A the microwave 208 is shown with an addition of a male power connector 402 and a female power connector 404, both of which may also have locking mechanisms that locks when mated. FIG. 4B shows the refrigerator 206 with an addition of a male power connector 406 that mates with the female power connector 404 of the microwave 208, for example. The appliances in such embodiments do not need to be electrically or otherwise connected to a framework/skeleton such as system 200, which is depicted in FIG. 2B. Please note that at the same time each appliance/facility may have its own means, such as a power cable, to be directly connected to a power supply.

Also, as accessories each appliance/facility may have magnets connected to its side(s), retractable or non-retractable handle(s) on its top or side(s), tool charger hooks, and retractable or folding chair(s). Such accessories may also be attached to any part of system 200.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B," and also the phrase "A and/or B" will be understood to include the possibilities of "A" or "B" or "A and B."

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. An article of manufacture that serves as a portable breakroom or recreation-room, the article of manufacture comprising:
    a dolly with a substantially rigid framework and only two wheels, wherein the framework is connected to the wheels and is configured to move on the wheels by pushing and/or pulling the framework over a surface;
    mini kitchen and/or recreation room appliances, permanently or detachably attached to the framework;
    wherein the framework is configured to receive electricity from an electrical source that is or is not attached to the framework and to distribute the electricity among the desired appliances; and
    wherein the framework is configured to receive water from a water source that is or is not attached to the framework and to distribute the water among the desired appliances.

2. The article of manufacture of claim 1, wherein the framework also acts as an antenna for receiving and/or transmitting wireless signals.

3. The article of manufacture of claim 1, wherein the framework also acts as a hotspot for internet access.

4. The article of manufacture of claim 1, wherein the framework further comprises power and/or water connectors or ports that easily mate with power or water connectors or ports of mini appliances upon placing the desired appliances in their allotted spaces.

5. The article of manufacture of claim 1, wherein the appliances include any combination of a cooler, a microwave, a sink, a toaster, a burner, and a coffee maker.

6. The article of manufacture of claim 1, wherein the framework further includes any combination of a USB port, a current limiting device, lights, GPS, an alarm, and a communication system.

7. The article of manufacture of claim 1, wherein other attachments to the framework are any combination of a toolbox, a foldable or non-foldable table, loud speakers, individual and/or collective locking mechanism for appliances, a storage cabinet, a trashcan, a wet or dry vacuum, a washer, a dryer, a washer-dryer, a location transmitter, and a radio/TV/music player.

8. The article of manufacture of claim 1, wherein the wheels are motorized.

9. The article of manufacture of claim 1, wherein the electrical source is city power or an attached or a non-attached chargeable or non-chargeable battery or an attached or a non-attached electrical power generator or a combination thereof.

10. The article of manufacture of claim 1, wherein the water source is a water hose/pipe or an attached exchangeable or refillable water tank.

11. A breakroom system comprising:
    a dolly with a substantially solid skeleton and only two wheels connected to the skeleton such that the skeleton moves on the two wheels by pushing and/or pulling the skeleton;
    mini household amenities, permanently or detachably attached to the skeleton;
    wherein the skeleton is configured to receive electricity from an electrical source that may or may not be attached to the skeleton and to distribute the electricity among the desired amenities; and
    wherein the skeleton may be configured to receive water from a water source that may or may not be attached to the skeleton and to distribute the electricity among the desired amenities.

12. The system of claim 11, wherein the skeleton further comprises power and/or water connectors or ports that easily mate with power or water connectors or ports of mini appliances upon placing the desired appliances in their allotted spaces.

13. The system of claim 11, wherein the mini household amenities include any combination of a cooler, a microwave, a sink, a toaster, a burner, and a coffee maker and wherein the skeleton further includes any combination of a USB port, a current limiting device, lights, GPS, an alarm, a location transmitter, and a communication system.

14. The system of claim 11, wherein the electrical source is city power or an attached or a non-attached chargeable or non-chargeable battery or an attached or a non-attached electrical power generator or a combination thereof.

15. The system of claim 11, wherein the water source is a water hose/pipe or an attached exchangeable or refillable water tank.

* * * * *